S. W. SINSHEIMER.
CONCENTRATED PRODUCT OF NITROGEN AND POTASH AND PROCESS OF RECOVERING AND SOLIDIFYING SAME.
APPLICATION FILED MAY 10, 1913. RENEWED JAN. 23, 1915.
1,134,921.
Patented Apr. 6, 1915.
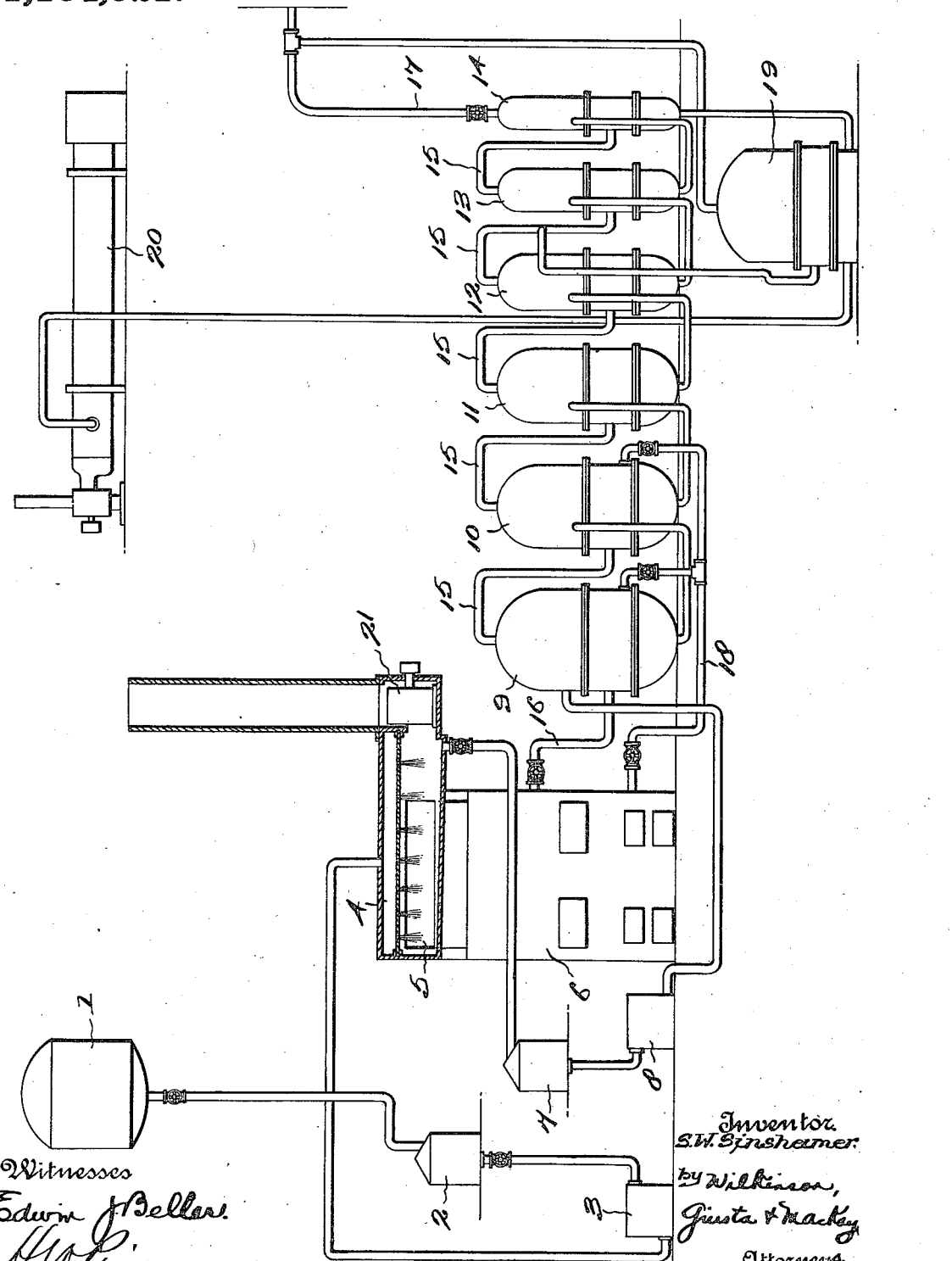

UNITED STATES PATENT OFFICE.

SIDNEY W. SINSHEIMER, OF SWINK, COLORADO.

CONCENTRATED PRODUCT OF NITROGEN AND POTASH AND PROCESS OF RECOVERING AND SOLIDIFYING SAME.

1,134,921.     Specification of Letters Patent.     Patented Apr. 6, 1915.

Application filed May 10, 1913, Serial No. 766,893. Renewed January 23, 1915. Serial No. 4,073.

*To all whom it may concern:*

Be it known that I, SIDNEY W. SINS-HEIMER, a citizen of the United States, residing at Swink, in the county of Otero and State of Colorado, have invented certain new and useful Improvements in Concentrated Products of Nitrogen and Potash and Processes of Recovering and Solidifying Same; and I do hereby declare the following to be a full, clear, and exact description of the invention, such as will enable others skilled in the art to which it appertains to make and use the same.

This invention consists of a concentrated product of nitrogen and potash, and relates also to a process for recovering same from the waste liquid remaining in the separation of sugar from molasses and in solidifying said valuable by-products into a composite mass.

In the commercial processes for manufacturing sugar from sugar beets, there remains a waste liquid containing large quantities of lime. This waste liquid contains a number of valuable substances, including potash and nitrogen, but, owing to the large amount of water present and the contained scale-forming substances, such liquids have been allowed to go to waste, and the primary object of the present invention is to treat such liquids and produce a concentrated product of nitrogen and potash in composite form for general commercial use, such as a fertilizing agent.

To this end, the invention consists of the product itself in the combined concentrated form for commercial use, and in the steps and processes herein described and claimed for recovering said combined concentrate from the waste liquid remaining in the separation of sugar from molasses.

In the accompanying drawings forming a part of this application, I have illustrated diagrammatically one means for carrying out my improved process.

In the operation of my invention, the waste liquid remaining in the separation of beet sugar from molasses is heated in a suitable tank 1 to a high temperature, preferably 100° C. or more, to precipitate a portion of the lime and sugar therefrom. The hot liquid is then passed through a filter 2 to remove such precipitate and the filtrate delivered, as by a pump 3, to a chamber 4 in the upper portion of a conduit 5 for the hot products of combustion from the furnace of a boiler 6; suitable means, such as a fan 21, being employed to produce a sufficient draft for said hot gases.

The chamber 4 is shown provided with a perforated bottom for discharging the liquid in a finely divided condition across the current of hot furnace gases flowing through the conduit 5, thereby insuring a thorough and efficient action of the $CO_2$ contained in said gases for converting the salts of the liquid into carbonates. The carbonates thus formed are only slightly soluble in the liquid and are removed to a large extent by a filter 7 to which the liquid is discharged by gravity from the conduit 5; the filtrate being delivered from the filter 7, as by a pump 8, to the first evaporator unit 9 of a multiple effect. I have shown a multiple effect consisting of six evaporator units, 9, 10, 11, 12, 13 and 14 connected in series by pipes 15 in the usual manner; steam being supplied to the steam space of the first unit 9 by a supply pipe 16 from the boiler 6, and a suitable condenser being connected to the final unit 14 by a pipe 17. The condensed steam from the steam spaces of the first two units 9 and 10 is fed to the boiler through a pipe 18, thereby providing a distilled feed water at advantageously high temperature.

The liquid is economically concentrated in the multiple effect to increase its proportion of solids from about four per cent. to approximately sixty per cent. or seventy per cent.

The concentrated mass is discharged from the final evaporator unit 14 into a finishing pan 19 connected between one of the series of evaporator units and a succeeding unit of said series or the condenser. The mass is delivered from the finishing pan 19 to any suitable standard type of drier 20 where it is thoroughly dried at a low temperature to prevent the escape of its valuable nitrogen constituents; the dried product containing from three per cent. to five per cent. of nitrogen and from twelve per cent. to twenty-five per cent. of potash in the form of an oxid.

In the preferred operation of my invention, I treat the filtrate from the filter 7 with a sufficient quantity of commercial sulfuric acid to convert the salts into sulfates; when this step is employed, the potash remaining in the final product is in the form of a sulfate.

I claim:

1. A fertilizing agent comprising a combination of potash and nitrogen in solid form consisting of the residue of waste liquid after the separation of sugar from molasses, treated with $CO_2$ and evaporated at a low temperature to produce a concentrated compound.

2. The herein described process for recovering potash and nitrogen compounds from the raw waste liquid remaining after the separation of sugar from molasses, which comprises treating said liquid at a high temperature with $CO_2$, then filtering the same, and finally drying the filtrate at a temperature low enough to prevent substantially the escape of nitrogen constituents.

3. The herein described process of recovering potash and nitrogen compounds from the raw waste liquid remaining in the separation of sugar from beet molasses, which consists in subjecting such liquid to a high temperature to precipitate sucrate of lime, then filtering the hot liquid, then treating the filtrate with $CO_2$, then filtering the liquid, and then evaporating the filtrate at a low temperature.

4. The herein described process for recovering potash and nitrogen compounds from the raw waste liquid remaining in the separation of sugar from molasses, which consists in subjecting such liquid to a high temperature, then filtering the hot liquid, then treating the filtrate with $CO_2$ in the presence of heat, then filtering the liquid, then concentrating the filtrate, and then drying the concentrate at a low temperature.

5. The herein described process for recovering potash and nitrogen compounds from the raw waste liquid remaining in the separation of sugar from molasses, which consists in subjecting such liquid to a temperature of approximately 100° C. to precipitate a portion of the lime and sugar therefrom, then filtering the hot liquid to remove such precipitate, then treating the filtrate with hot furnace gases to precipitate a portion of the salts in the form of carbonates, then filtering the liquid to remove such precipitate, then subjecting the filtrate to the combined action of a low temperature and a vacuum to concentrate such filtrate, and then drying the concentrate at a low temperature.

In testimony whereof, I affix my signature, in presence of two witnesses.

SIDNEY W. SINSHEIMER.

Witnesses:
 EDW. S. STEWART,
 C. B. MARTIN.